United States Patent [19]

Samuels

[11] Patent Number: 4,868,657
[45] Date of Patent: Sep. 19, 1989

[54] SYSTEM FOR IMAGE PRODUCTION BY VARIABLE SCANNING

[75] Inventor: Mark A. Samuels, Hockley, United Kingdom

[73] Assignee: GEC-Marconi Limited, Rochester, United Kingdom

[21] Appl. No.: 129,756

[22] Filed: Dec. 4, 1987

[30] Foreign Application Priority Data

Dec. 5, 1986 [GB] United Kingdom ............... 8629166
Jun. 17, 1987 [GB] United Kingdom ............... 8714198

[51] Int. Cl.$^4$ ............................................. H04N 7/01
[52] U.S. Cl. ..................................... 358/140; 358/113
[58] Field of Search ............... 358/113, 206, 208, 199, 358/109, 140, 137, 180; 250/334, 332

[56] References Cited

U.S. PATENT DOCUMENTS

| | | | |
|---|---|---|---|
| 4,222,065 | 9/1980 | Pusch .................................. | 358/113 |
| 4,262,119 | 4/1981 | Bridges et al. .................... | 358/113 X |
| 4,419,692 | 12/1983 | Modisette et al. ................ | 358/113 |
| 4,477,834 | 10/1984 | Beaumont et al. ................ | 358/113 |

Primary Examiner—James J. Groody
Assistant Examiner—Victor R. Kostak
Attorney, Agent, or Firm—Lowe, Price, LeBlanc, Becker & Shur

[57] ABSTRACT

A video imaging system comprising: a detector with an odd number of elements for the simultaneous scanning of a swath consisting of a corresponding odd number of parallel horizontal image lines; a variable vertical scanning device for causing the detector to scan the image repeatedly over an image frame; and a scan controller arranged to control the variable scanning device to select the scan rate to provide an overlap between adjacent swaths, and selectively to stagger in the vertical direction the starting points of successively scanned frames by a simple fraction, for example ½, of the perpendicular distance ($a$) between adjacent image lines. The scan controller is capable of effecting either an interlaced scan or a non-interlaced scan without the need to switch mechanical or optical components of the imaging system.

14 Claims, 11 Drawing Sheets

(a) INTERLACED SCAN (b) NON-INTERLACED SCAN

(a) INTERLACED SCAN (b) NON-INTERLACED SCAN

| SWATH PERIOD | 1 | 2 | 3 | 4 | 5 | 6 | 7 | 8 | 9 | 10 | 11 |
|---|---|---|---|---|---|---|---|---|---|---|---|
| CHANNEL NOS. 1 TO (n+1) BOTH SCAN MODES — INPUT STORE | A | B | A | B | A | B | A | B | A | B | A |
| CHANNEL NOS. 1 TO (n+1) BOTH SCAN MODES — OUTPUT STORE |  | A | B | A | B | A | B | A | B | A | B |
| CHANNEL NOS. (n+2) TO (2n+1) INTERLACED SCAN — INPUT STORE | C | D | C | D | C | D | C | D | C | D | C |
| CHANNEL NOS. (n+2) TO (2n+1) INTERLACED SCAN — OUTPUT STORE |  | C | D | C | D | C | D | C | D | C | D |
| CHANNEL NOS. (n+2) TO (2n+1) NON-INTERLACED SCAN — INPUT STORE | C | D | E | C | D | E | C | D | E | C | D |
| CHANNEL NOS. (n+2) TO (2n+1) NON-INTERLACED SCAN — OUTPUT STORE |  | C | C | D | E | C | D | E | C | D | E |

| SWATH PERIOD | 1 | 2 | 3 | 4 | 5 | 6 | 7 | 8 | 9 | 10 | 11 | 12 |
|---|---|---|---|---|---|---|---|---|---|---|---|---|
| INPUT STORE  | A | B | A | B | A | B | A | B | A | B | A | B |
| OUTPUT STORE |   | A | B | A | B | A | B | A | B | A | B | A |
| INPUT STORE  | C1 | D1 | C1 | D1 | C1 | D1 | C1 | D1 | C1 | D1 | C1 | D1 |
| OUTPUT STORE |    | C1 | D1 | C1 | D1 | C1 | D1 | C1 | D1 | C1 | D1 | C1 |
| INPUT STORE  | C1 | C2 | D1 | D2 | C1 | C2 | D1 | D2 | C1 | C2 | D1 | D2 |
| OUTPUT STORE |    | C1 | C1 | C2 | D1 | D2 | C1 | C2 | D1 | D2 | C1 | C2 |

CHANNEL NOS. 1 TO (n+1) — rows 2-3

CHANNEL NOS. (n+2) TO (2n+1) INTERLACED SCAN — rows 4-5

CHANNEL NOS. (n+2) TO (2n+1) NON-INTERLACED SCAN — rows 6-7

SYSTEM FOR IMAGE PRODUCTION BY VARIABLE SCANNING

TECHNICAL FIELD

This invention relates to an image scanning system, and is particularly relevant to video systems.

BACKGROUND ART

In television, the image is formed by a number of horizontal lines arranged vertically down the display area. Each complete image frame is commonly produced as two interlaced fields, thus enabling a greater number of lines to be presented on the display without apparent flickering of the image than would be possible otherwise. Imaging systems producing video signals to this format perform the scanning of the image in a like manner, that is, as two interlaced fields.

However, an electronic imaging system is also often required to be used as an input sensor for electronic systems that may process or analyse the image and possibly produce some output actions as a result. In this case, the scanning of the image as a number of fields can cause difficulties: for example, if there is a moving object in the field of view then the time difference between scanning the object for each field causes a spatial displacement of the image of that object between the fields forming the complete image frame.

Accordingly, such systems ideally require the image scanning to be non-interlaced to minimise the time difference between the scanning of points in the image that are spatially close.

Figure 2:
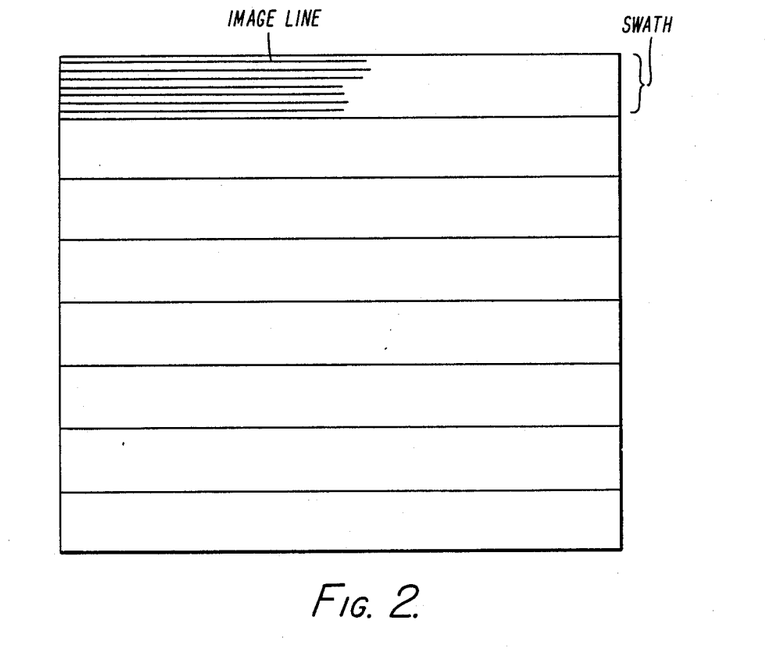
FIG. 2, to which reference has already been made, is a diagram of an image frame divided into swaths.

It is known to focus electromagnetic radiation from a scene onto a detector which converts this radiation into an electrical signal, the detector being subdivided vertically into a number of elements, such that each element produces a line in the output image. A continuous group of lines is scanned simultaneously and such a group of lines is termed a 'swath'. The complete image is thus scanned as a number of such swathes adjacent vertically in the image (FIG. 2). The vertical scanning of these swathes is produced by relative displacement of the focussed image and the detector during the scan period. Such a displacement may be implemented, for example, by mechanical movement of a mirror in the optical path.

The vertical scanning rate depends on the vertical displacement required between swathes and the time taken to output the detector element signals for each swath. The detector element signal output time (swath period) will depend on how the image is scanned horizontally, for example, if a horizontal optical scanning mechanism is used, then the swath period will equal the horizontal scan repetition period of this mechanism.

Previously-known imaging systems provide either interlaced or non-interlaced scanning, but not both; it has been necessary to change mechanical or optical components of the system in order to change the scanning mode.

SUMMARY OF THE INVENTION

The present invention overcomes this limitation by providing an imaging system comprising: a detector for the simultaneous scanning of a swath consisting of an odd number of parallel image lines of an image frame; a variable scanning means for causing the detector to scan successive swaths displaced in a direction perpendicular to the image lines; and scan control means arranged to control the variable scanning means (i) to select the perpendicular scan rate in relation to a predetermined swath period during which one swath is scanned, such as to cause either no overlap or an overlap in the said perpendicular direction between adjacent scanned swaths, and (ii) selectively to offset the starting point of successively scanned fields in the said perpendicular direction by a simple fraction of the perpendicular distance between adjacent image lines, whereby the image is scanned selectively either as interlaced fields or as a single non-interlaced frame.

The provision of an odd number of parallel image lines in one swath enables successive swaths to be overlapped by equal amounts, for example by half a swath width, such that the image lines of adjacent swaths are interdigitated. A frame comprising two interlaced fields, for example, may be provided by setting the offset at one half the said perpendicular distance, without any overlap between successive swaths. With the same swath period, a single non-interlaced frame may alternatively be produced simply by electronically changing the scan control means so that there is an overlap of one half a swath width and no offset between frames. In most video applications, the swathes will of course be horizontal, the said perpendicular scanning direction being vertical.

Preferably, the imaging system comprises signal processing means for converting image line signals received in parallel from the detector into a serial signal in which the image information relating to successive image lines is in sequence. The detector preferably comprises an odd number of active elements for scanning respective image lines of the swath.

BRIEF DESCRIPTION OF THE DRAWINGS

In order that the invention may be better understood, preferred embodiments will now be described, by way of example only, with reference to the accompanying diagrammatic drawings, in which.

DESCRIPTION OF THE PREFERRED EMBODIMENT(S)

Figure 1:
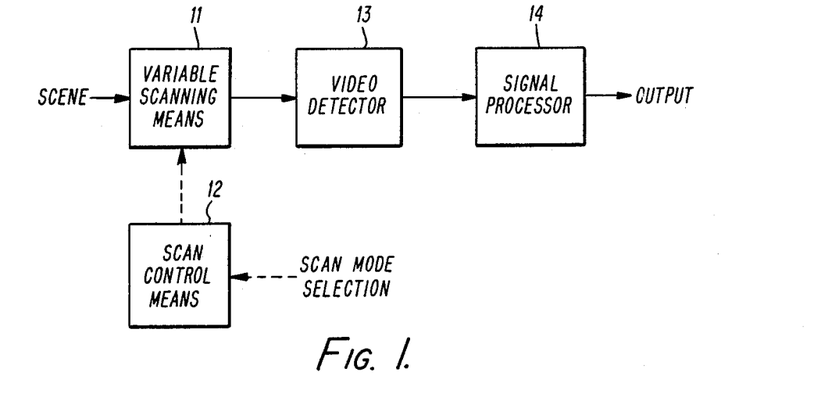
FIG. 1 is a block diagram of apparatus embodying the invention.

With reference to FIG. 1, an imaging system for video comprises a video detector 13 comprising parallel linear elements; and variable scanning means 11 comprising a horizontal scanner for the horizontal displacement of the detector relative to an image ("SCENE") to scan a swath of horizontal image lines; and a vertical scanner for the vertical displacement of the detector relative to the image to scan successive swaths.

The variable scanning means 11 is controlled by scan control means 12 whose mode of operation is determined by a "SCAN MODE SELECTION" input, for example by manually-operable switches. The video detector 13 provides parallel video signals to signal processor 14, illustrated below with reference to FIG. 8 and, in an alternative form, FIG. 10, which provides a serial "OUTPUT" signal.

Variable scanning means for thermal imaging are well known in the art and the particular arrangement utilized is not material to the invention. A sample is shown by way of illustrative example in FIGS. 13(a) and 13(b). Another illustrative example may be seen in U.S. Pat. No. 4,262,199 to Bridges.

Figure 12:
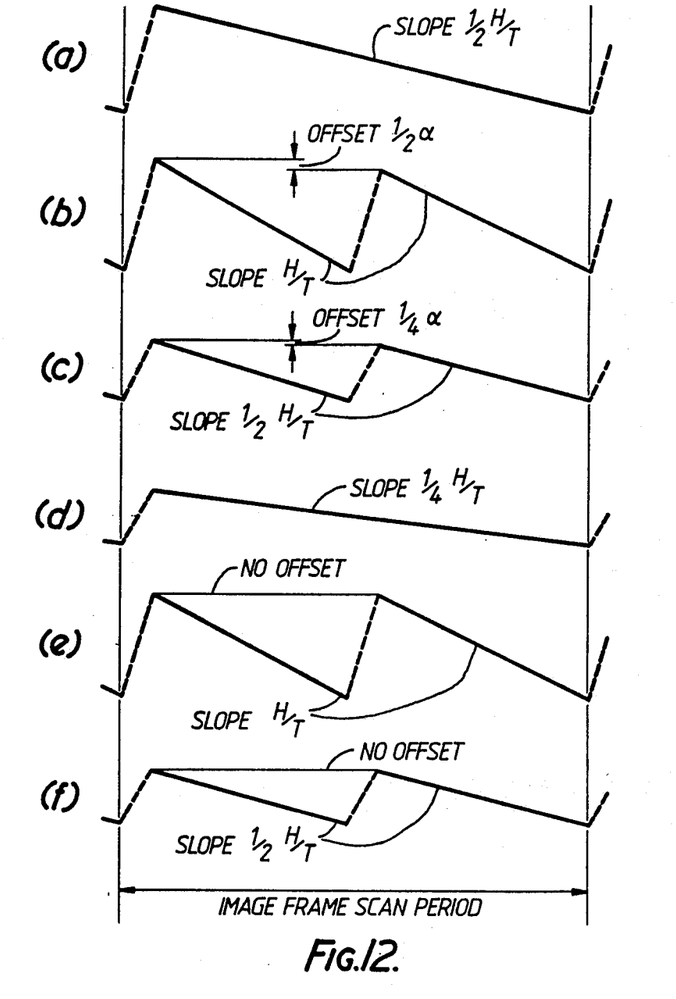
FIGS. 12(a) to 12(f) are various vertical scan waveforms corresponding to FIGS. 6(a) and 6(b) for producing different interlaced and non-interlaced frames.
Figure 13A:
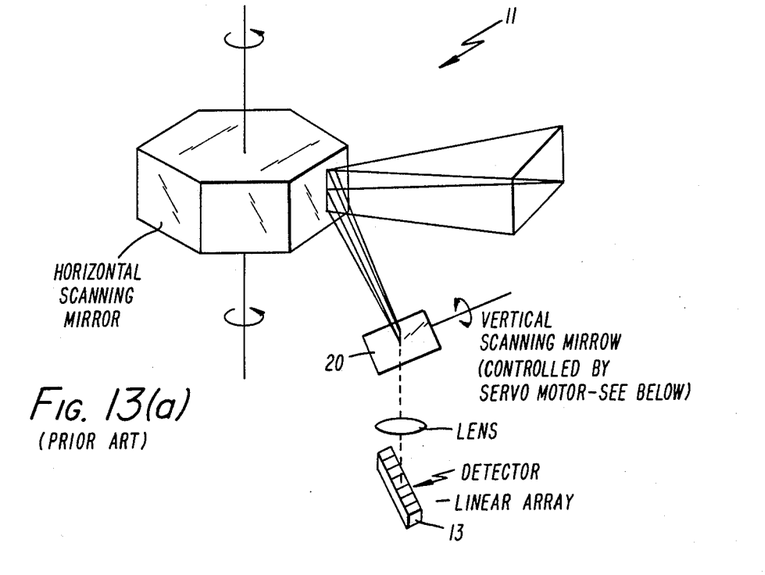
FIGS. 13(a) and 13(b) show illustrative examples of known variable scanning means.
Figure 13B:
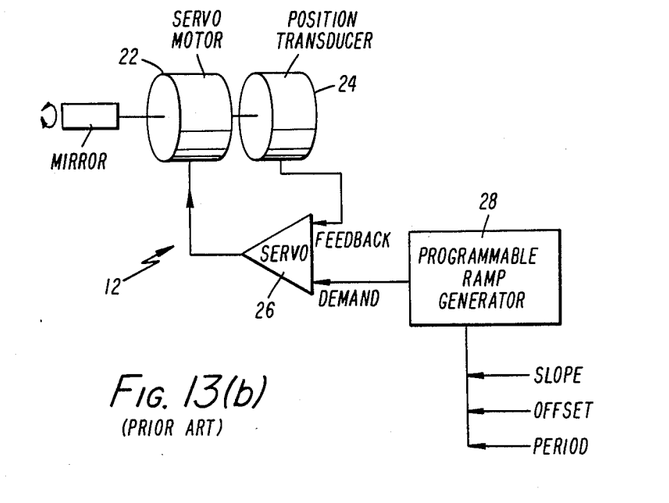

Referring to FIGS. 13(a) and 13(b) the video detector 13 may be an array of single parallel linear infrared sensitive elements as is well known in the art. The variable scanning means 12 controls the oscillating motion of a mirror 20 which provides the vertical scanning. The position of the mirror is changed by a servo motor 22 which is linked to a conventional position transducer 24 providing a signal indicating the instantaneous position of the mirror. This signal forms a feedback to a servo controller 26 which is also provided with a signal from a programmable ramp generator 28. The function of the ramp generator is to provide control signals of the type illustrated by way of example in FIG. 12 with preset slope, offset and period. The servo controller insures that the actual position of the mirror and the desired position of the mirror are the same as will be understood by those skilled in the art.

Figure 3:
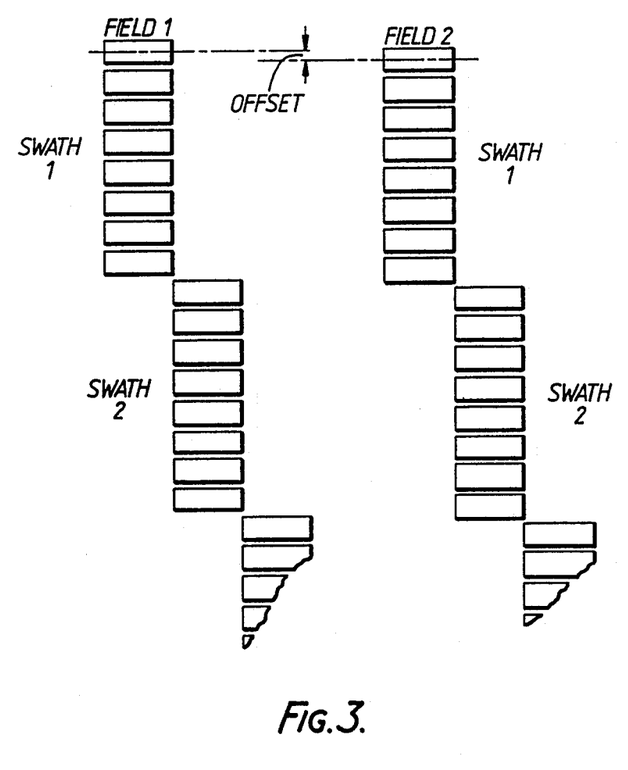
FIG. 3 illustrates how two interlaced fields are composed of vertically-displaced swaths.
Figure 8:
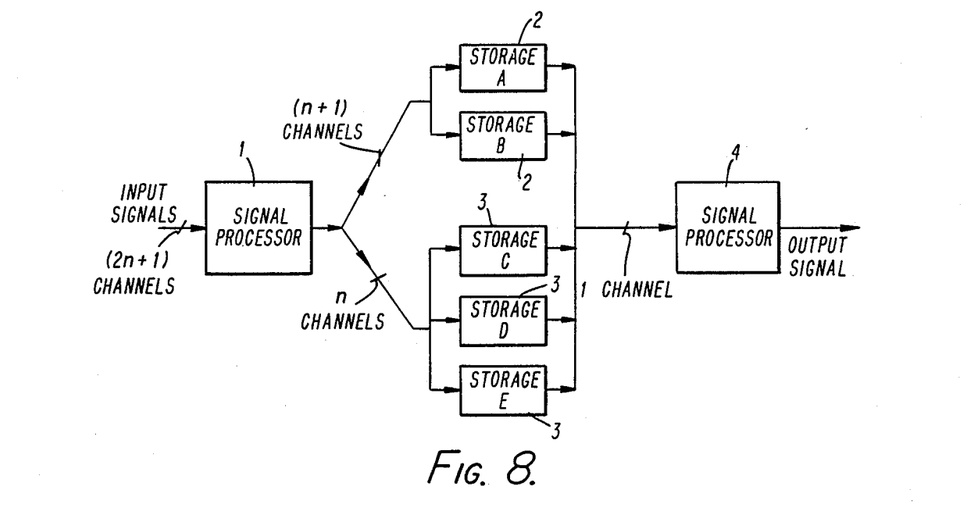
FIG. 8 is a block diagram of signal processing circuitry for converting parallel signals from the detector into a serial output signal.
Figure 10:
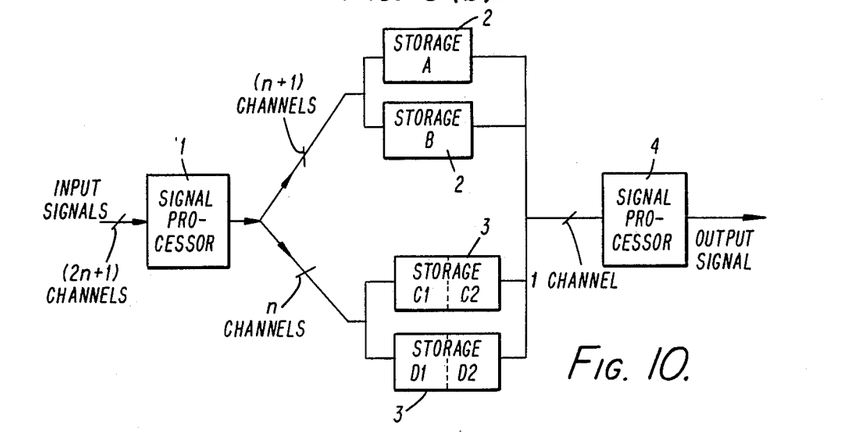
FIG. 10 is a block diagram of alternative signal processing circuitry to that of FIG. 8.

The signal processing circuits 1 shown in FIGS. 8 and 10 provide amplification and matching of signals and, where desired or appropriate, analog to digital conversion as will be understood by those skilled in the art. The further signal conditioning or processing circuits 4 in FIGS. 8 and 10 are optional and may be utilized to provide the desired form of output signal.

Where interlaced scanning is required, during each frame period the image will be scanned twice vertically across the detector with a small vertical displacement between positions for the two fields equal to half a detector element spacing, as shown in FIG. 3, in which each rectangle represents the field of view on the image of one detector element, and the page is orientated similarly to the image.

Figure 4A:
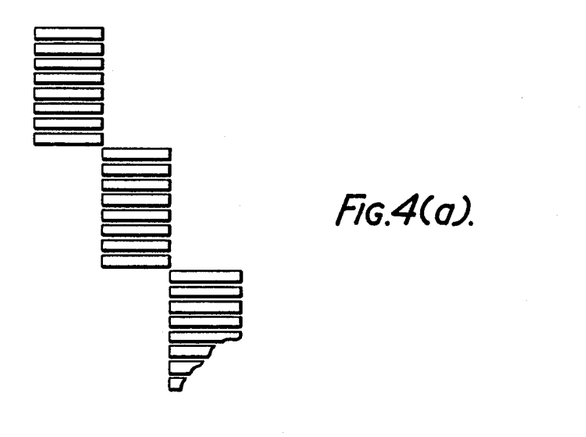
FIG. 4A illustrates one way of preventing overlap between successive swaths for non-interlaced frames.

To produce a version giving a non-interlaced scan over the same field of view, it is necessary to halve the rate of the vertical scanning such that one vertical scan occurs for each frame period. Further, to prevent consecutive swathes from overlapping, one solution might be to halve the detector effective height, that is to halve its apparent size in object space. This arrangement (FIG. 4A) would have disadvantages: the amount of radiation received by the detector would be reduced by a factor of 4, reducing sensitivity by a related amount; the width of the detector element vertical sampling function would be halved which could lead to increased vertical aliassing; and the optical configuration would have to be altered to effect the effective detector height reduction.

Figure 4B:
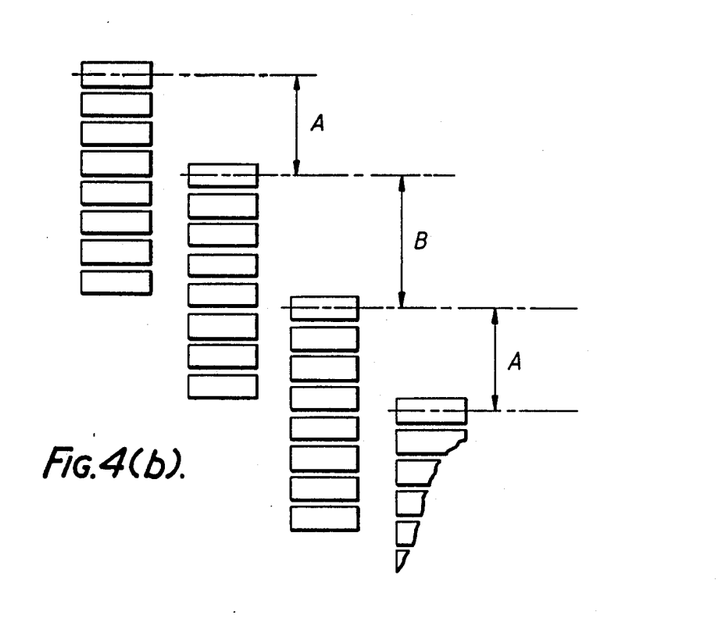
FIG. 4B illustrates another way of providing a non-interlaced frame.

A better arrangement would be to retain the original optical configuration and arrange that the overlapping of the swathes produces a detector interlace effect as shown in FIG. 4B.

It may be seen from FIG. 4B that applying this idea where, as is usual in conventional detectors, there is an even number of elements in the detector, then the vertical displacement between consecutive swathes would have to alternate between two values A, B. Such a non-linear vertical scan could be implemented, but this could not then be simply reconfigured for an interlaced scan.

Figure 5:
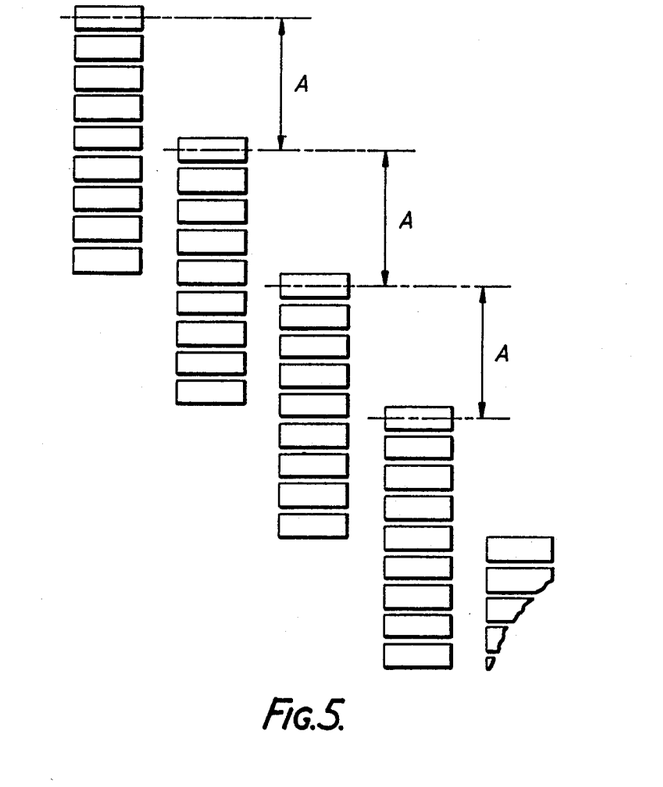
FIG. 5 illustrates non-interlaced scanning with an odd number of detector elements, in accordance with an embodiment of the invention.

In a preferred embodiment of the invention illustrated in FIG. 5, an odd number of detector elements is used, providing linear vertical scanning.

The vertical scanning technique will now be described in more detail.

For this method, as explained, an odd number of detector elements is required. Let the number of detector elements be $(2n+1)$ where n is a positive integer, and let the detector element spacing be $a$. The vertical scannig waveforms for the two modes of operation are shown in FIGS. 6a and 6b.

Figure 6:
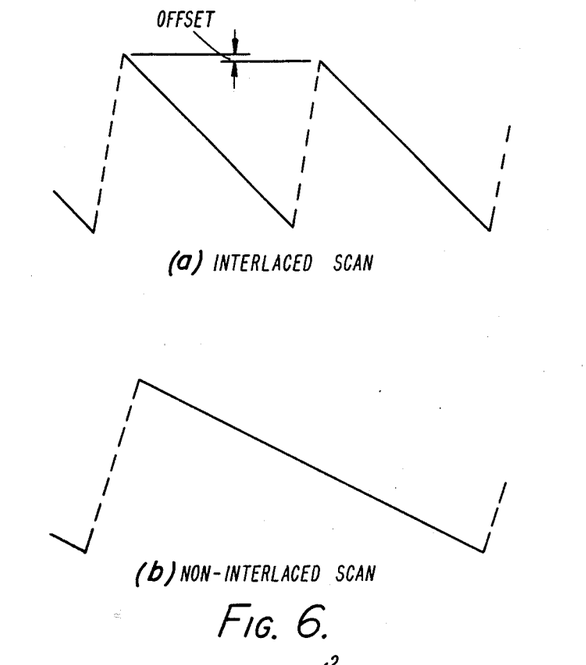
FIG. 6(a) is a waveform showing the variation of vertical displacement of the detector relative to the image as a function of time, for an interlaced scan of the whole image frame.
FIG. 6(b) is a waveform corresponding to FIG. 6(a) but for a non-interlaced scan of the same frame.

FIG. 6a shows a waveform for interlaced scanning. The vertical scan consists of two linear ramp waveforms. The rate of change of these ramps is given by:

$$\frac{(2n+1)a}{T} = \frac{H}{T}$$

where T is the time taken to scan each swath horizontally and H is the detector height. Consecutive scans are thus displaced by H, the detector height. Also there is a vertical offset between the ramps for the two fields of size:

$$a/2$$

this being equal to half the detector element spacing.

The selection of the vertical scan rate and of the vertical offset between successively-scanned frames is made by scan control means (not shown) which include electronic circuitry and a control panel whereby different scanning modes may be selected manually.

FIG. 6(b) shows a waveform for non-interlaced scanning. Here the vertical scan consists of a single linear ramp. The rate of change of this ramp is given by:

$$H/2T$$

and thus consecutive swathes are displaced by:

$H/2 = (n + \frac{1}{2})$ detector element spacings

FIGS. 6a and 6b also indicate periods between the ramp waveforms which may be required by the vertical scanning mechanism for flyback.

Figure 7:
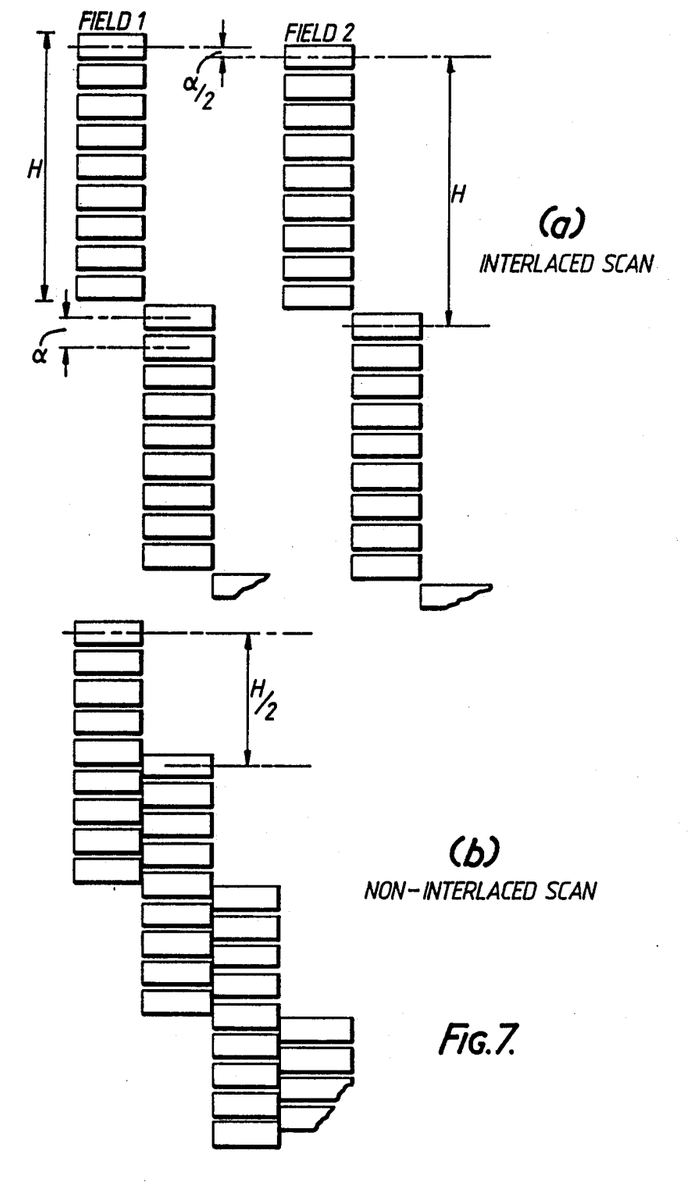
FIG. 7(a) shows the interlaced scanning effected with the waveform of FIG. 6(a)
FIG. 7(b) shows the non-interlaced scanning effected with the waveform of FIG. 6(b)

For example, the vertical displacements of a 9 element detector for the scanning modes of FIGS. 6(a) and 6(b) are shown in FIGS. 7(a) and 7(b) respectively.

It should be noted that for the non-interlaced scan (FIG. 7(b)) half of each of the first and last swathes have no corresponding overlapping swathes and thus a total of one swathe cannot be used for the output. In most cases however this will be compensated for by the fact that only one flyback period will be required for the non-interlaced scan mode, thus enabling more swathes to be scanned than for the interlaced scan mode.

For most applications it will be necessary to process the parallel output signals from the detector to convert the swath-scanned image to a sequential serial (line by line) scanned output. Also it will be seen that the action of such processing must be different according to whether the scanning is interlaced or non-interlaced. Methods that may be used to perform this scan conversion for either method of scanning will now be described.

In both the methods described the parallel-to-serial scan conversion is achieved by storing the line signals from the detector in a number of stores or storage devices in parallel during a swath period and then outputting these lines serially during a subsequent swath period.

The first method is shown in FIG. 8 and is most suitable where either analogue or digital first-in, first-out (FIFO) devices are used for storage.

As shown, the $(2n+1)$ signals from the detector elements are first passed through signal conditioning circuits (11). These signal conditioning circuits may for example amplify and match the signals and, if digital storage is used, convert the signals from analogue to digital form.

The signals are then split into two groups: the first $(n+1)$ signals from the detector (i.e. those that will be output first according to the scan direction) are input to one of two stores or memory devices 2 designated A and B. These stores each have a capaicty to store $(n+1)$ image lines in parallel.

The remaining (n) signals from the detector are input to one of three stores 3 designated C, D and E. These stores 3 each have a capacity to store (n) image lines in parallel.

Figure 9A:
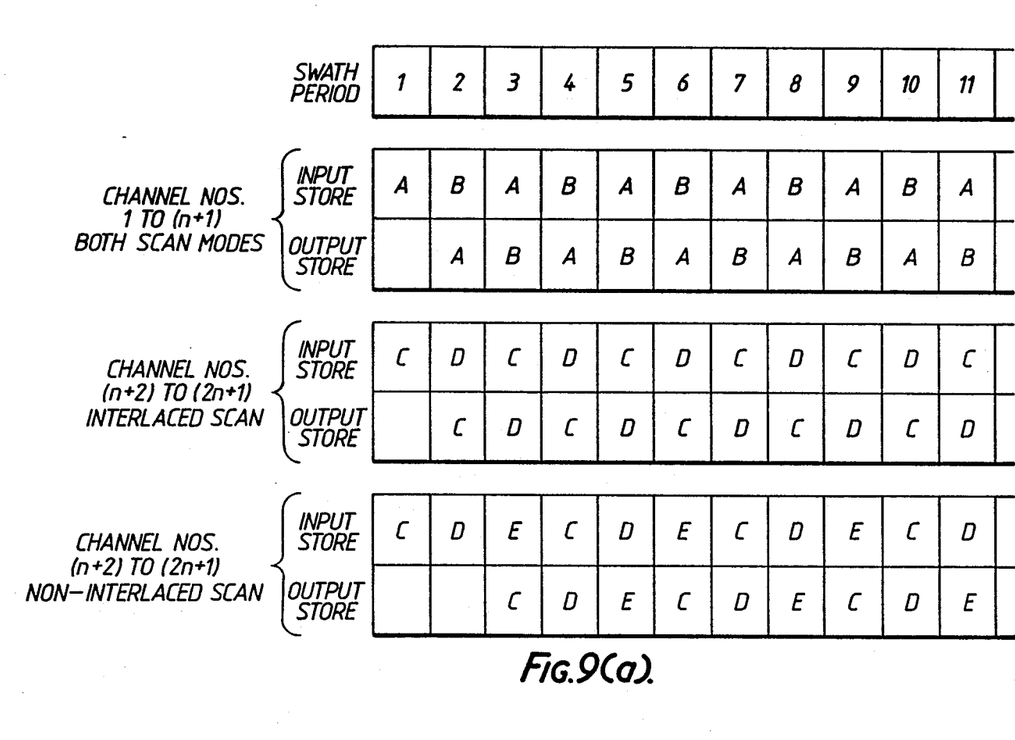
FIGS. 9(a) and 9(b) represent the manner of operation of the circuitry represented in FIG. 8.

FIG. 9a in which A, B, C, D and E represent the corresponding stores 2 and 3 of FIG. 8, shows how image lines are input to and output from the stores for each of the two scan modes.

Figure 9B:
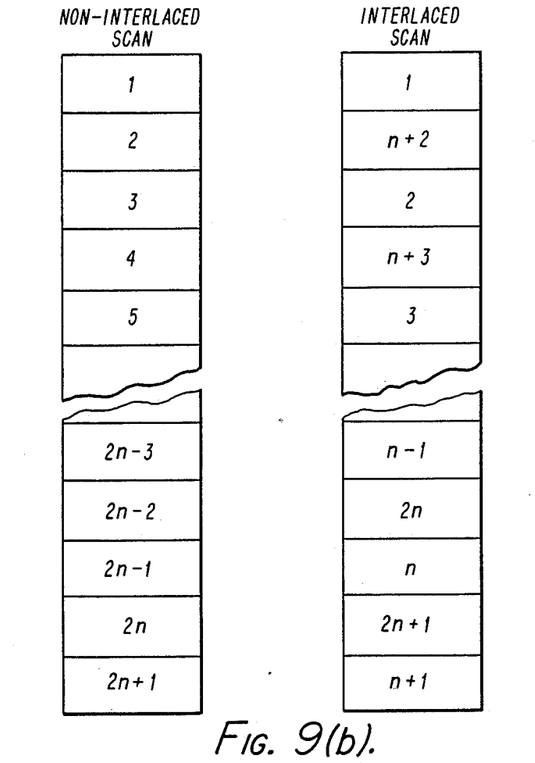

FIG. 9b shows the output order for the lines within each swath period for each of the two scan modes. Here channel 1 indicates the signal from the top detector element defined by the scan direction.

Finally, as shown in FIG. 8, the serial output signal may be passed through further signal conditioning circuits 4 such that the output signal may be converted to a suitable form.

The second method is shown in FIG. 10 and is more suitable when random access memory (RAM) devices are used for storage.

As previously described with reference to FIG. 8, the detector signals may be conditioned by signal conditioning circuits 1 and are then split into two groups.

As before, the first $(n+1)$ signals from the detector are sent to one of two stores (2) designated A and B each of capacity $(n+1)$ image lines.

The second group, comprising the last (n) signals from the detector are sent to one of two stores 3 designated C and D. These stores are of capacity (2n) image lines and are split into two separately addressable areas, each of capacity (n) image lines, designated C1, C2 and D1, D2 as shown.

Figure 11:
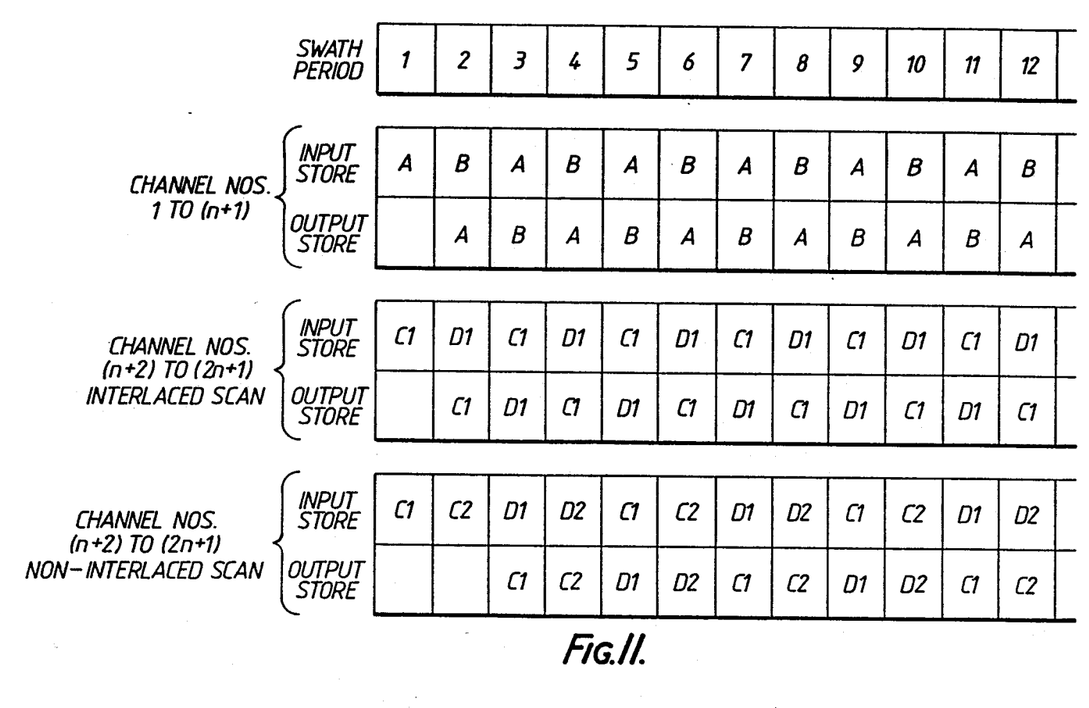
FIG. 11 represents the manner of operation of the circuitry of FIG. 10.

FIG. 11 shows how image lines are input to and output from the stores of FIG. 10 for each of the scan modes. The output order for lines within each swath period is again as shown in FIG. 9b.

Again (FIG. 10) further processing 4 of the serial signal may be included to produce an output signal in suitable form.

FIG. 12 illustrates how the selection, by electronic means, of different vertical scan waveforms in the scan control means is able to produce not only interlaced or non-interlaced frames but also a vertical zoom or other effects.

FIGS. 12(a) and 12(b) correspond to FIGS. 6(b) and 6(a) respectively, and produce full-size non-interlaced and interlaced image frames respectively.

The waveform of FIG. 12(c), which causes the image to move past the detector twice at a rate of half a detector height per frame period, and also introduces an offset of a quarter of a detector element spacing between the two passes, produces an interlaced scan with a 2:1 vertical zoom.

A corresponding 2:1 verticla zoom with a non-interlaced scan may be selected by using the waveform of FIG. 12(d), in which, during one image frame scan period, the image is moved past the detector once at a rate of one quarter of a detector height per swath period, resulting in an overlap of three-quarters of a swath width.

The waveform of FIG. 12(e) causes, during an image frame scan period, the image to move past the detector twice at a rate of one detector height per swath period but with no offset between the two passes, thus effectively halving the image vertical resolution and doubling the frame rate.

The waveform of FIG. 12(f) causes, during an image frame scan period, the image to move past the detector twice at a rate of half a detector height per swath period but with no offset between the two passes, thus effectively halving the image vertical field of view and doubling the frame rate.

Where a vertical zoom is provided, a corresponding horizontal zoom may also be provided electronically by suitable conventional signal processing on the output signal. Further, particularly where rapid scan rates are used, such as in the examples of FIGS. 12(e) and 12(f), a temporal filter may be used on the detector output signals in order to increase the sensitivity of the system.

Thus the preferred embodiments of the invention combine the use of an odd number of detector elements with the ability suitably to modify the vertical scanning action to provide a scanning imager that may be simply configured to scan a given image either as two interlaced fields or as a single non-interlaced frame. The system may be configured for either interlaced or non-interlaced scanning without modification to mechanical or optional components.

I claim:

1. An imaging system comprising detector means for simultaneously scanning in a first direction a swath consisting of an odd number of parallel image lines of an image frame; variable scanning means for causing said detector means to scan successive swaths displaced in a second direction perpendicular to the image lines; and scan control means arranged to control the variable scanning means (i) to select the perpendicular scan rate, in relation to a predetermined swath period during which one swath is scanned, such as to selectively cause no overlap or overlap in the said perpendicular direction between adjacent scanned swaths, and (ii) selectively to offset the starting point of successively scanned fields in the said perpendicular direction by a simple fraction of the perpendicular distance between adjacent image lines, whereby the image is scanned selectively either as interlaced fields or as a single non-interlaced frame.

2. An imaging system according to claim 1, comprisig signal processing means for converting image line signals received in parallel from the detector into a serial signal in which the image information relating to successive image lines is in sequence.

3. An imaging system according to claim 1, wherein the detector comprises an odd number of active elements for scanning respective image lines of the swath.

4. An imaging system according to claim 2, wherein the detector comprises an odd number of active elements for scanning respective image lines of the swath.

5. An imaging system according to claim 1, wherein the scan control means is arranged selectively either (i) to provide a scan rate which causes successive swaths to overlap by half a swath width, providing a single non-interlaced frame, or (ii) to provide a scan rate which causes no such overlap but to offset the said starting points by one half the said perpendicular distance, providing two interlaced fields in the same period as the non-interlaced frame.

6. An imaging system according to claim 1, in which the scan control means is operable to produce two interlaced fields with a 2:1 zoom in the said perpendicular direction by scanning half the length of the image (in the perpendicular direction) twice at a scan rate which causes an overlap between successive swaths of half a swath width, and with the said offset equal to one quarter of the said perpendicular distance.

7. An imaging system according to claim 1, wherein the scan control means is operable to produce a non-interlaced scan with a 2:1 zoom in the said perpendicular direction by scanning half the length of the image (in the perpendicular direction) at half the scan rate appropriate to a non-interlaced scan of the whole image, resulting in an overlap of three-quarters of a swath width between successive swaths.

8. An imaging system according to claim 1, comprising scanning means for causing the detector to scan the image parallel to the image lines.

9. An imaging system according to claim 2, comprising scanning means for causing the detector to scan the image parallel to the image lines.

10. An imaging system according to claim 3, comprising scanning means for causing the detector to scan the image parallel to the image lines.

11. An imaging system according to claim 4, comprising scanning means for causing the detector to scan the image parallel to the image lines.

12. An imaging system according to claim 5, comprising scanning means for causing the detector to scan the image parallel to the image lines.

13. An imaging system according to claim 6, comprising scanning means for causing the detector to scan the image parallel to the image lines.

14. An imaging system according to claim 7, comprising scanning means for causing the detector to scan the image parallel to the image lines.

* * * * *